(12) United States Patent
Kegeler

(10) Patent No.: US 7,489,054 B2
(45) Date of Patent: Feb. 10, 2009

(54) PLANAR DIRECT DRIVE UNIT COMPRISING A POSITION MEASURING SYSTEM

(75) Inventor: Jörg Kegeler, Schleusingen (DE)

(73) Assignee: INA Drives & Mechatronics GmbH & Co oHG, Suhl (DE)

( * ) Notice: Subject to any disclaimer, the term of this patent is extended or adjusted under 35 U.S.C. 154(b) by 414 days.

(21) Appl. No.: 10/563,196

(22) PCT Filed: Jun. 29, 2004

(86) PCT No.: PCT/CH2004/007042

§ 371 (c)(1),
(2), (4) Date: May 12, 2006

(87) PCT Pub. No.: WO2005/004313

PCT Pub. Date: Jan. 13, 2005

(65) Prior Publication Data

US 2007/0108933 A1 May 17, 2007

(51) Int. Cl.
*G05B 1/06* (2006.01)
(52) U.S. Cl. .................................. 310/12; 318/135
(58) Field of Classification Search ............... 310/12; 318/135

See application file for complete search history.

(56) References Cited

U.S. PATENT DOCUMENTS

| 5,126,648 | A | | 6/1992 | Jacobs | |
|---|---|---|---|---|---|
| 5,688,084 | A | * | 11/1997 | Fritz et al. | 409/202 |
| 6,933,700 | B2 | * | 8/2005 | Lahr et al. | 318/640 |
| 7,136,249 | B2 | * | 11/2006 | Hoefer et al. | 360/75 |
| 2005/0134993 | A1 | * | 6/2005 | Hoefer et al. | 360/75 |

FOREIGN PATENT DOCUMENTS

| DE | 19531520 | 1/1997 |
|---|---|---|
| DE | 19513325 | 6/2000 |
| DE | 20210305 | 10/2002 |

* cited by examiner

*Primary Examiner*—Gary F. Paumen
(74) *Attorney, Agent, or Firm*—Klaus P. Stoffel

(57) ABSTRACT

The invention relates to a planar direct drive unit comprising a passive unit (1), an active unit (3), a bearing unit, and a position measuring system that is provided with a material measure and a measuring sensor which scans the material measure and supplies a position signal. The inventive positioning measuring system encompasses a moved component (7) and a quasi stationary component (8), one of which is formed by the material measure while the other one is formed by the measuring sensor. Both components are disposed outside the bearing gap (4) and at a distance from the running surface (2).

21 Claims, 6 Drawing Sheets

PLANAR DIRECT DRIVE UNIT COMPRISING A POSITION MEASURING SYSTEM

This is a National Phase application of International application No. PCT/EP2004/007042 filed Jun. 29, 2004, which claims priority from DE 10329931.9 filed Jul. 2, 2003 and DE 10357585.5 filed Dec. 8, 2003.

BACKGROUND OF THE INVENTION

The present invention concerns a planar direct drive (also known as a planar motor), which includes a position measuring system for controlling the travel of the rotor. Direct drives of this type have a passive unit with a planar running surface, in which magnetic flux regions are integrated. This passive unit constitutes the stator of the motor. In addition, there is at least one active unit (rotor) with coil systems for generating a variable magnetic flux. The active unit can move on the running surface of the passive unit. Furthermore, the direct drive has a bearing unit, which allows frictionless two-dimensional relative motion of the active and passive units.

DE 195 13 325 A1 describes, for example, a Hall sensor position measuring device for use in linear and planar motors. To this end, several Hall sensors are integrated in the active unit, which detects variations in magnetic field strength arising from the relative motion of the active and passive units. The tooth pitch on the running surface of the passive unit constitutes the measurement standard, which is scanned by the sensors. However, this also limits the positioning accuracy of the planar motor, which depends directly on the tooth pitch and its accuracy. Positioning accuracies in the range of 20-40 μm can be realized by the use of these well-known position measuring methods. Another problem is that the positioning accuracy also depends on environmental conditions, especially the temperature of the passive unit. The running surface of the passive unit consists to a great extent of metallic materials (especially soft iron material), which have a relatively high temperature coefficient. Due to ambient temperature variations and also due to self-heating produced by the operation of the motor, the running surface can experience considerable expansion, so that the measurement standard itself experiences linear expansion that is significant with respect to the desired positioning accuracy. If direct drives of this type are to be used for positioning tasks with high accuracy requirements, errors of this type can no longer be tolerated. Ongoing miniaturization in many technical fields requires rather an increase in positioning accuracy, which cannot be achieved with previously known integrated position measuring systems.

Higher measuring accuracies can be realized, for example, if external measuring systems are used, for example, with the use of laser interferometers or glass scales. In this case, however, either large and heavy position measuring standards must be carried by the active unit, or coupling to external measurement standards is necessary. This type of arrangement is problematic, especially with planar motors, since the active units are meant to be moved two-dimensionally as desired on a larger running surface. The use of optical measuring methods is also possible only to a limited extent, since the path of working beams would frequently be disturbed by other elements (for example, other active units moving on the running surface, cables, and the like).

In this connection, DE 202 10 305 U1 describes a positioning table of a high-speed linear motor, which uses a position measuring system that consists of a reading head mounted on the primary part and a strain gage mounted on the rotor. A problem here is that the bearing gap must be enlarged to prevent damage to the strain gage during movement. However, this drastically reduces the maximum motive force. Furthermore, the reading head is mounted in a stationary way on a certain place of the primary part, so that an exact position determination is possible only in the area of the adhesively mounted strain gage. The position measuring system is not available beyond the travel range detected by the strain gage.

SUMMARY OF THE INVENTION

Therefore, the objective of the present invention is to make available an improved planar direct drive, which includes a position measuring system that has greater positioning accuracy than previously known integrated position measuring systems, and at the same time avoids the disadvantages of external position measuring systems. In particular, the invention seeks to make it possible to position the active unit of the direct drive with a high degree of accuracy with respect to predetermined fixed points. In addition, the invention specifies designs of the active unit that allow simple and exact positioning of a moving component. Finally, an attendant objective is to make available simple mounting means for a quasi-stationary component which, in interaction with the active unit, allows not only high positioning accuracy but also substantial standardization of different tool supports and workpiece holders.

These and other objectives are achieved by the present invention, in which the positioning system comprises a moving component and a quasi-stationary component, one of which is formed by a measurement standard, while the other is formed by a measuring sensor. The quasi-stationary component is arranged at a predetermined fixed point outside of the bearing gap and essentially parallel to but vertically separated from the running surface. Since the quasi-stationary component, which, for example, can be the measurement standard, does not have to be integrated in the running surface or the bearing gap, it has no unfavorable effects on the motive force that is produced by the magnetic flux. In addition, the quasi-stationary component is better protected from damage than if it were mounted, for example, on the running surface.

The invention is further characterized by the fact that the moving component is arranged on the active unit in such a way that, when it reaches the quasi-stationary component, it comes into measuring contact with it. When optical or magnetic measuring components are used, mechanical measuring contact is not necessary. For the position measuring system to function, it is sufficient if the two components are positioned close enough together. As long as this functional measuring contact exists, the active unit is controlled or regulated by evaluation of the position signal supplied by the measuring sensor. Well-known automatic control systems can be used for this. This allows very exact positioning of the active unit within a predetermined measuring area. For this purpose, as a component of the active unit, this measuring area, which is defined by the measurement standard that acts as a component of the position measuring system, is placed in or moved into the regions in which the positioning must be accomplished with a high degree of accuracy. Outside of these regions, the active unit can be positioned with a lower degree of accuracy, and a global measuring system is preferably reverted to, or the direct drive operates conventionally in step operation.

In accordance with a first embodiment of the invention, the quasi-stationary component of the position measuring system is mounted on an adapted frame member, which is connected with the passive unit, so that a permanently fixed position of the quasi-stationary component is realized. It is possible to arrange several frame members with quasi-stationary components at specific fixed points on the running surface of the passive unit. These frame members can be, for example, tool modules for carrying out various work tasks. The active unit can be moved as desired between these fixed points or tool modules, and the highly accurate position measuring system can be reverted to in the vicinity of each of these fixed measuring points.

In a second embodiment, the quasi-stationary component is integrated in a fixed module, whose position in the plane of the passive unit is fixed by at least one mechanical securing device mounted on the passive unit, and one or more holding magnets are integrated in the fixed module and hold the fixed module on the running surface of the passive unit. The mechanical securing devices are preferably realized as positioning pins, so that the fixed module can be placed at the intended place on the running surface of the passive unit without special tools and can be arranged there, already in the plane of the running surface, with great accuracy by the positioning pins. To prevent the fixed module from slipping during operation and to be able to absorb applicable forces, the holding magnet produces a stable connection with the passive unit.

In a further modified embodiment, the quasi-stationary component is not rigidly connected with the passive unit but rather is fastened to a second active unit, which can move relative to the passive unit and relative to the first active unit. For certain tasks, it is sufficient if the relative position of several moving active units can be determined with a high degree of accuracy. The absolute position of the active units on the running surface of the passive unit does not matter or does not need to be determined with the same degree of accuracy. In these cases as well, it is sufficient if the position measuring system supplies corresponding position signals as long as the active units must be moved in the immediate vicinity of each other to execute predetermined tasks. In this connection, it should be noted that the repeat accuracy of direct drives, even when conventional global position measuring systems are used or in step operation, is significantly higher than a positioning accuracy of only about 30-40 μm. Therefore, on the running surface, fixed points can be defined, towards which the second active unit (which carries the quasi-stationary component) can move with high accuracy, namely a repeat accuracy of about 2-3 μm. With respect to this fixed point, the high positioning accuracy of the integrated position measuring system described above can be used within the aforementioned measuring surface.

It is especially advantageous if the moving component of the position measuring system is arranged in an externally accessible area with vertical displacement from the coil systems of the active unit. For this purpose, the active unit has a multilayer construction, so that the moving component and the access to it do not interfere with an optimum configuration of the actual drive elements. This multilayer construction can be additionally expanded by mounting a workpiece holder with vertical displacement from the moving component, which workpiece holder is adapted to the given task of the direct drive and to the workpiece/tool to be moved. This configuration also has the advantage that the measurement standard or the measuring sensor is mounted in the immediate vicinity of the workpiece/tool that is to be positioned, which allows significant reduction of measuring errors due to wobbling. The position measurement is made in the immediate vicinity of the workpiece whose position is of primary interest. Higher-order measuring errors thus have very little effect on the measurement result.

The uncoupling of the active unit from the position measuring system and the simultaneous connection of the moving component with the workpiece holder also allow modular solutions, in which an active unit can convey different workpiece holders, each of which carries its own, adapted moving component of the position measuring system.

It is advantageous to use a cross-grating plate as the measurement standard, while especially optical or magnetic sensors are suitable as measuring sensors. Grating foils can also be used as the measurement standard.

The active unit preferably has a holding frame, which is arranged parallel to its running surface and in which the support plate is replaceably positioned. The moving component of the position measuring system is arranged in a plane that lies between the coil system of the active unit and the support plate. The moving component is preferably located on the underside of the support plate. This design of the active unit makes it possible to keep the parallel misalignment of the measurement standard and the running surface very small, e.g., less than 50 μm. This increases the accuracy of the position measuring system.

In a further refined embodiment of the invention, the support plate is mounted in the holding frame by special alignment devices for the purpose of ensuring a high repeat accuracy even when the support plate is changed. These alignment devices are formed, for example, by permanent magnets in the holding frame and iron pins opposite the permanent magnet in the support plate. The resulting magnetic forces of the alignment devices uniquely determine the position of the support plate in the holding frame if the alignment devices are arranged, for example, according to the three-point principle. However, the alignment devices can also consist of thrust balls and communicating recesses or other suitable systems.

It should be pointed out that the use in accordance with the invention of the above-explained position measuring system in planar direct drives allows greater accuracy than, for example, with the use of Hall sensor measuring systems or with automatic control of the direct drives in microstep operation. Compared to position determination by camera-supported image analysis, which is used in some cases, the measuring system used here also has considerable advantages, since significantly less data must be processed, so that the direct drive can be automatically controlled more quickly.

Another important aspect of the invention is that the passive unit itself or the running surface formed on it is no longer integrated in the measuring sequence. This also eliminates the adjustment operations that would otherwise be necessary.

Finally, the coupling between the direct drive and the position measuring system presented here allows significant cost reduction, since the position measuring system can be built with commercially available components, and the measurement standard can be designed significantly smaller than the total available running surface.

In addition, a conventional global measuring system can be used for the movement of the active units between the individual fixed points, since the accuracy requirements for these movements are not especially stringent. Step operation of the drive between the fixed points is likewise possible, and the higher repeat accuracy levels compared to an absolute accuracy can be utilized during the movement along a specified path.

BRIEF DESCRIPTION OF THE DRAWINGS

Further advantages, details, and refinements are described below with reference to the preferred embodiments illustrated in the drawings.

DETAILED DESCRIPTION OF THE INVENTION

Figure 1:
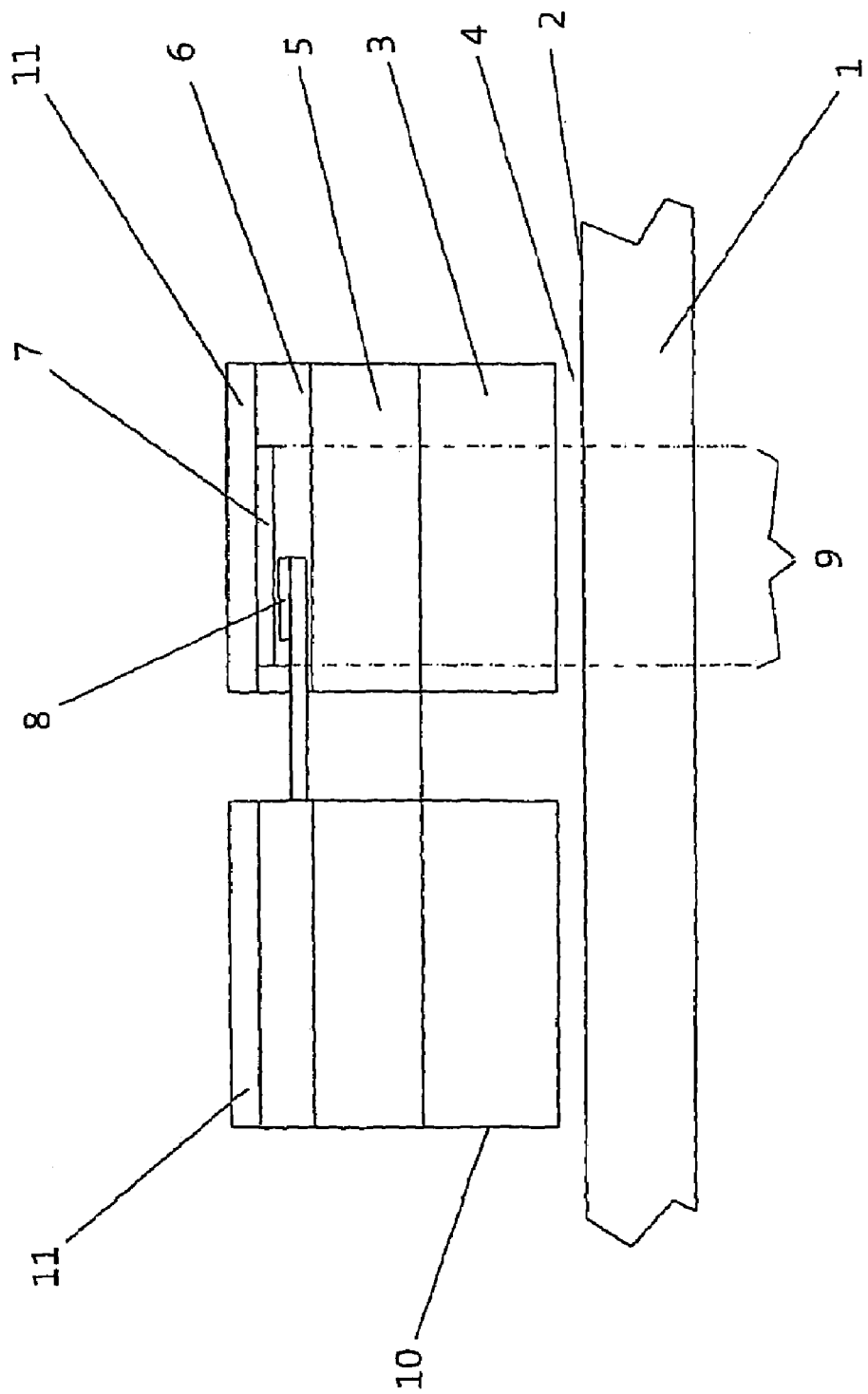
FIG. 1 shows a simplified side view of a planar direct drive of the invention, which comprises a passive unit and two active units.

The planar direct drive shown in FIG. 1 comprises a passive unit 1, the upper side of which has a running surface 2. A tooth pitch, for example, which runs crosswise and consists of magnetizable teeth and nonmagnetizable tooth spaces, is formed on the running surface 2. Those skilled in the art are already familiar with the general design of direct drives of this type, so there is no need to provide a detailed description of how this planar motor works.

The direct drive also has a first active unit 3, which can be moved in at least two directions of motion on the running surface 2 when power is supplied by suitable means. To allow movement despite the force of magnetic attraction between the active unit 3 and the passive unit 1, a bearing unit is necessary, by which a bearing gap 4 is maintained during the operation of the direct drive. Air bearings (not shown) are suitable and preferred for this purpose. They produce an air gap between the running surface 2 and the active unit 3.

With respect to the vibration and acceleration behavior, it is advantageous to arrange the relatively heavy coil systems, including the iron cores and possibly permanent magnets (not shown) in the lower region (plane I) of the active unit, i.e., as close as possible to the running surface 2, in the plane of which the motive forces are produced. In a middle region (plane II) of the active unit 3 that lies above the lower region, accessory elements 5 can be provided, for example, the necessary electronic circuits and connection elements for the power supply. In a third plane (plane III) of the active unit, a measuring component space 6 is provided. The measuring component space 6 of the first active unit 3 contains a moving component 7 of a position measuring system. In the illustrated example, the moving component 7 is a cross grating, which serves as the measurement standard. If the position measuring system is intended to monitor position changes in only one direction, the cross grating can be replaced, for example, by a glass scale. Although the moving component 7 is fixed relative to the first active unit 3, it moves with the active unit relative to the passive component.

To allow the position measuring system to generate an analyzable position signal, a second component is necessary, which is referred to here as the quasi-stationary component 8. In the embodiment shown in FIG. 1, the quasi-stationary component 8 is a measuring sensor, which is regarded as stationary relative to the moving component 7. If the moving component 7 enters the detection region of the measuring sensor 8, a position signal can be generated by the measuring sensor as a function of the motion of the first active unit 3. The local measuring region, in which the position measuring system can be used to determine position, is defined by a measuring surface 9, which, in the example illustrated here, is essentially the same as the surface of the cross grating 7. More precisely, the measuring surface 9 is defined by the region in which the two components 7, 8 of the position measuring system are in functional measuring contact and thus supply an analyzable position signal.

It will be obvious to an expert that the measuring accuracy of the position measuring system described here with the use of a highly accurate measurement standard and a suitable measuring sensor is significantly greater than could be achieved, for example, by scanning the teeth of the running surface 2, which act as the measurement standard.

In modified embodiments, an "overhead arrangement" can also be selected.

In the embodiment shown in FIG. 1, the quasi-stationary component 8 is attached to a second active unit 10, which in turn can be moved on the passive unit 1. The construction of the second active unit 10 is comparable, for example, to that of the first active unit 3.

In this application, the position measuring system is thus used to determine the relative position between the first active unit 3 and the second active unit 10. To occupy an exact position, the second active unit 10 can be moved, for example, to an established fixed point, which was exactly determined during a preceding calibration of the direct drive. As was explained earlier, the repeat accuracy during a return to the fixed point is quite high. The first active unit 3 is then moved to the vicinity of the second active unit 10 until the two components 7, 8 of the position measuring system come into measuring contact. The further position control of the moving active unit is then effected by evaluation of the position signal supplied by the position measuring system, so that the first active unit 3 can be positioned with a high degree of accuracy relative to the second active unit 10 or the underlying fixed point. In this regard, it is possible, of course, to provide several fixed points on the passive unit, so that ultimately several measuring surfaces 9 are defined in the region of the running surface.

The active units 3, 10 illustrated in FIG. 1 have yet a fourth functional plane (plane IV), which can be arranged above the given components of the position measuring system and in each case comprises a workpiece holder 11. The workpiece holder 11 supports a suitable workpiece or a required tool, depending on the particular application. The workpiece holder 11 can be detachably connected with the actual active unit, so that it can be replaced for different tasks. In this regard, it is advantageous if the respective components 7, 8 of the position measuring system are connected with the workpiece holder 11 and are replaced with it. In this way, each workpiece holder can be assigned a desired measurement standard, which is adapted to the given accuracy requirements. The measured position is thus coupled to the workpiece holder and not to the active unit. Therefore, after the workpiece holder has been changed, recalibration of the measuring system is unnecessary.

Figure 2:
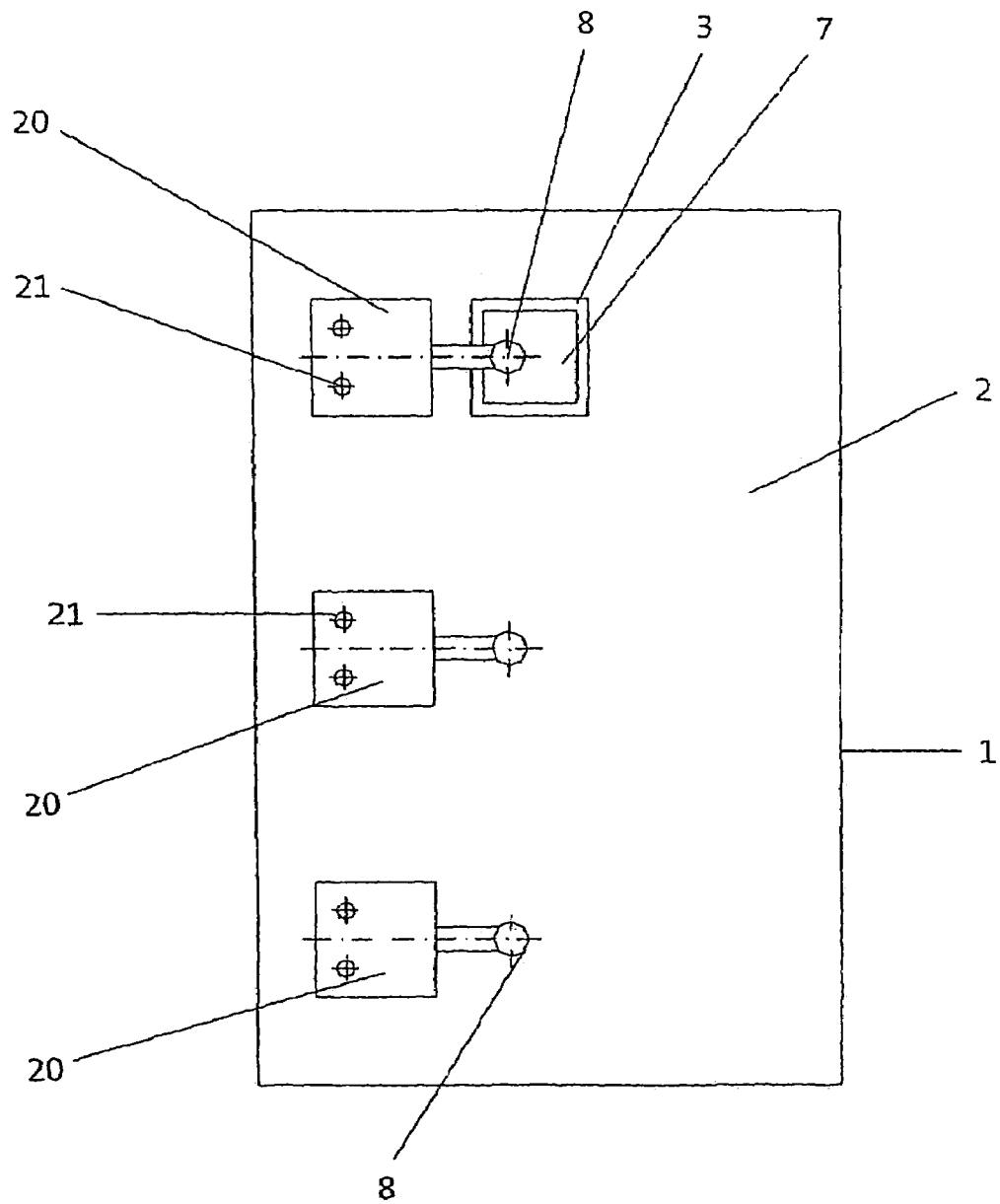
FIG. 2 shows a basic representation of a production unit with several work modules with the use of the direct drive of the invention in a top view.

FIG. 2 shows a top view of a production unit in simplified form with several work modules 20, wherein a modified embodiment of the direct drive of the invention is used. Several quasi-stationary components 8 are rigidly connected with the passive unit 1 by means of a frame member or the work modules 20. It is apparent that several work modules 20 can be positioned on the passive unit. In the example illustrated here, three work modules 20 and a moving active unit 3 are used. The position of the work modules 20 is predetermined, for example, by mounting pins 21. The fixed points for the quasi-stationary components 8 are thus also determined. In many cases, the absolute position of the given quasi-stationary component 8 with respect to the passive unit 1 does not matter or does not need to be determined with a high degree of accuracy, since the purpose of the positioning tasks is to make an exact determination of the position of the quasi-stationary component 8, which could mark, for example, the position of a gripping device, relative to the moving component 7, which represents the current position of the moving active unit 3.

The moving active unit 3 can move towards the specific work module 20 that is desired during a production process. The moving component 7 is always moved together with the moving active unit 3, so that positioning with a high degree of accuracy can be accomplished at each work module. In modified embodiments, several moving active units could also be arranged on the running surface 2 of the passive unit 1.

Figure 3:
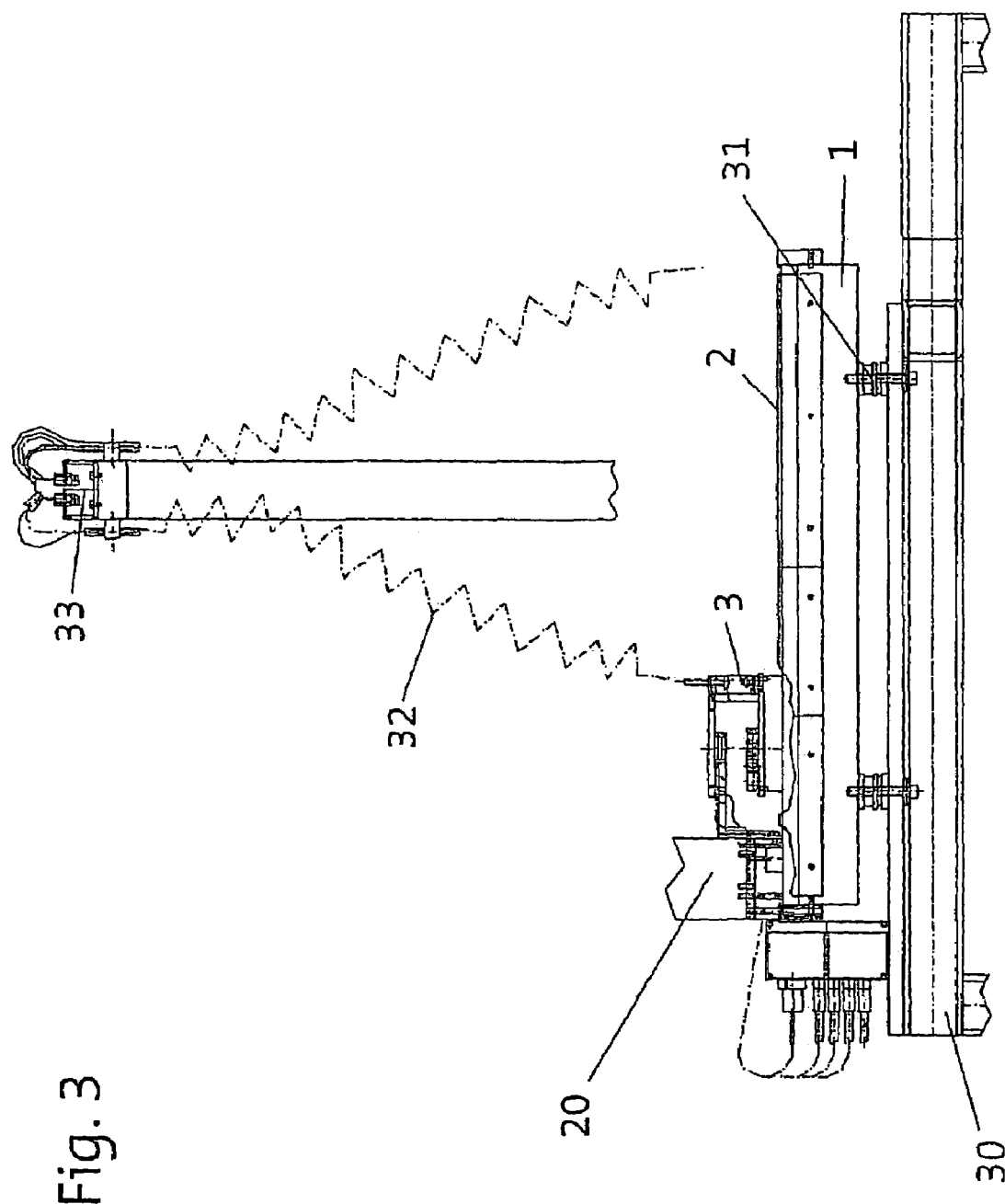
FIG. 3 shows a simplified general side view of a modified embodiment of the planar direct drive with position measuring system.

FIG. 3 shows a modified embodiment of the planar direct drive in a general side view. The passive unit 1 rests here on a frame 30, and suitable level controllers 31 are used to allow the running surface of the passive unit 1 to be set exactly horizontally. In the specific embodiment shown here, the direct drive has only a single active unit 3, which can move on the running surface 2 of the passive unit 1. In modified embodiments, it is also possible for several active units to be present, as described above.

Finally, at least one and usually several work modules 20, which are referred to here as fixed modules, are arranged on the edge of the passive unit 1. The moving unit 3 is supplied with power by flexible connecting lines 32, which can run, for example, from a power supply bridge 33, which bridges the passive unit.

Figure 4:
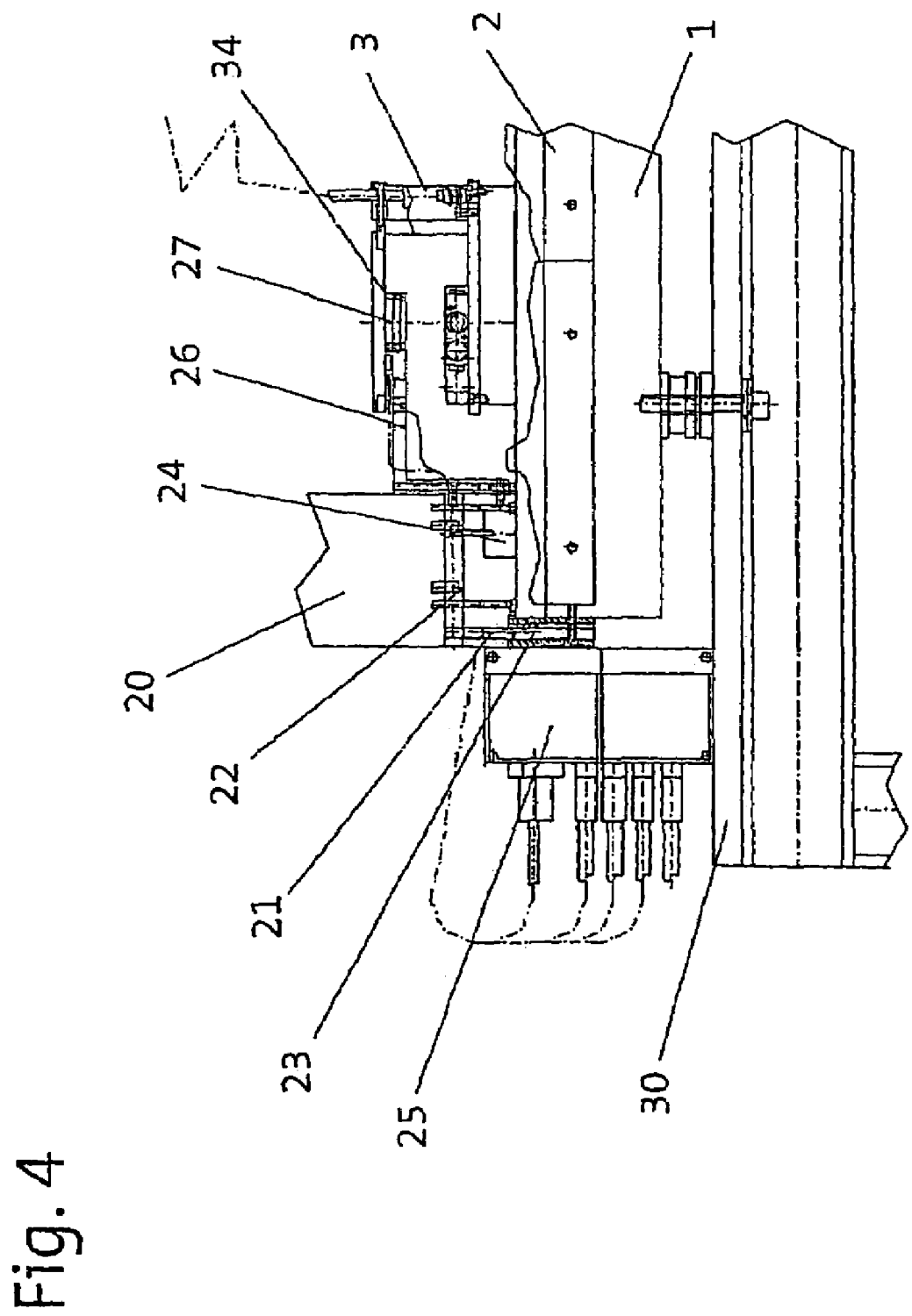
FIG. 4 shows a partially cutaway detail side view of a fixed module arranged on the passive unit of the direct drive shown in FIG. 3, wherein the position measuring system is shown in measuring contact.

FIG. 4 shows a partially cutaway detail side view of the fixed module 20 and the active unit 3. The fixed module 20 has a base plate 22, which is mounted by mounting pins 21 on a stop bar 23, which is rigidly mounted on the frame. The connection between the base plate, mounting pins, and stop bar is realized with high accuracy of fit, which, on the one hand, allows easy changing of the fixed modules and, on the other hand, presets the position of the fixed module in the plane of the running surface 2 of the passive unit 1 with very high accuracy. The base plate 22 can have standardized dimensions and can be fitted with various superstructural parts, so that fixed modules of many different types can be provided that are compatible with respect to their dimensions. Several fixed modules can be mounted on a stop bar and can be replaced by other fixed modules for different processing tasks.

To mount the fixed module 20 without a special tool on the passive unit, at least one holding magnet 24 is located in the base plate 22. The holding magnet 24 pulls the whole fixed module towards the running surface 2 of the passive unit 1, so that a stable position is assumed, which is maintained even while processing operations are being carried out.

A connection box 25 is provided at the edge of the passive unit 1 in the immediate vicinity of the stop bar 23 or as an integral part of the stop bar. The purpose of the connection box 25 is to supply the individual fixed modules with operating voltage, electronic control signals, hydraulics, pneumatics or similar media. Easily detachable plug connections are preferably provided between the fixed modules and the connection box 25, which allow fast service connection and maintain flexibility during replacement of the fixed modules.

In addition, a sensor arm 26 is mounted on the fixed module 20. A measuring sensor 27 is mounted on the end of the sensor arm 26 that extends beyond the fixed module. The measuring sensor 27 is the quasi-stationary component in the position measuring system. When the active unit 3 is moved close enough to the fixed module 20, the measuring sensor 27 comes into measuring contact with a measurement standard 34, which is mounted on the active unit 3 and functions as the moving component of the measuring system.

Figure 5:
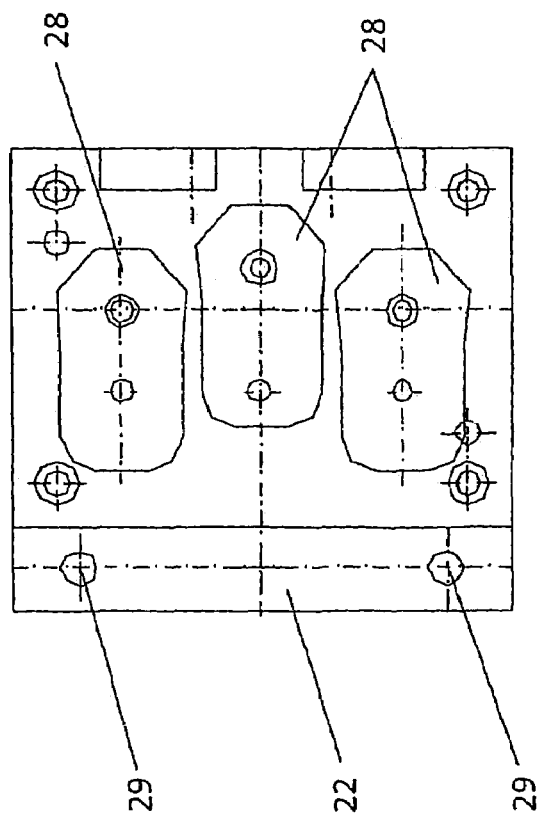
FIG. 5 shows a base plate of the fixed module shown in FIG. 4 in a view from below.

FIG. 5 shows the base plate 22 of the above-described fixed module 20 in a view from below. In the embodiment illustrated here, three recesses 28 are formed in the underside of the base plate, in which, depending on requirements, up to three electromagnets that serve as holding magnets 24 can be inserted. When it becomes necessary to change the fixed module 20, the electromagnets are disconnected from the power supply, so that the fixed module can be easily removed from the passive unit. In addition, two holes 29 are formed in the rear region of the base plate 22, and mounting pins 21 are inserted in the holes during operation.

Figure 6:
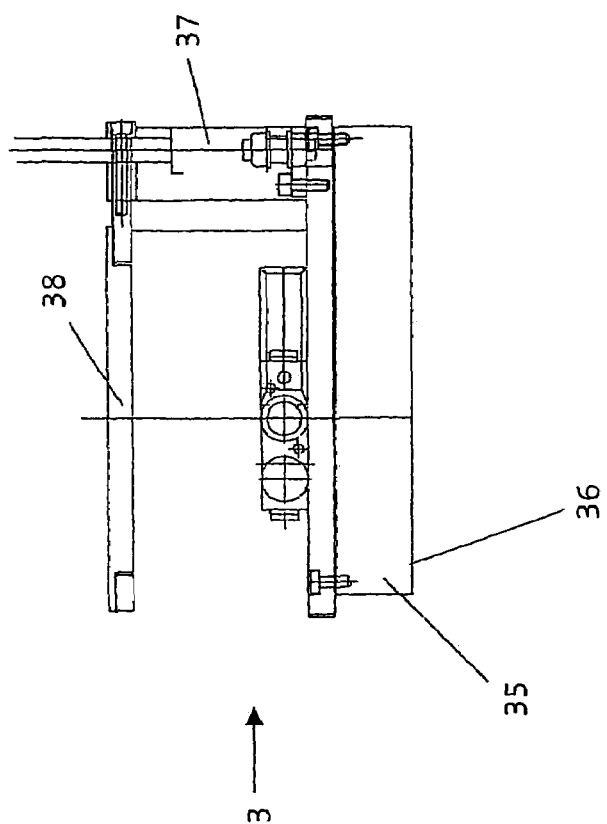
FIG. 6 shows a side view of the active unit of the direct drive shown in FIG. 3.

FIG. 6 shows a side view of the drive unit 3, which is explained in greater detail with reference to FIG. 4. The coil systems (not shown), which are needed for generating the motive forces, are located in a headstock 35. An active running surface 36, which interacts in a well-known way with the running surface 2 of the passive unit 1 to realize the direct drive, is located on the underside of the headstock 35. A spacer block 37, which supports a holding frame 38, is mounted on one side of the headstock 35. The holding frame 38 is preferably made of a nonmagnetizable material and extends parallel to the active running surface 36.

To be able to achieve a high degree of measuring accuracy later, after the holding frame 38 has been mounted on the active unit, it is subjected to another fine machining, so that the upper side of the holding frame 38 runs as exactly parallel to the active running surface 36 as possible. Since the active running surface 36 and the running surface 2 of the passive unit 1 are almost exactly parallel during the operation of the direct drive (especially when an air bearing is used), the holding frame 38 is also very exactly aligned with the passive unit. Due to the arrangement of the fixed module 20 on the passive unit, the fixed module is also very exactly aligned with the passive unit, so that during measuring contact between the measuring sensor 27 and the measurement standard 34 (see FIG. 4), the sensor and the measurement standard are almost exactly parallel, which causes the error resulting from parallel misalignment to become very small.

Figure 7:
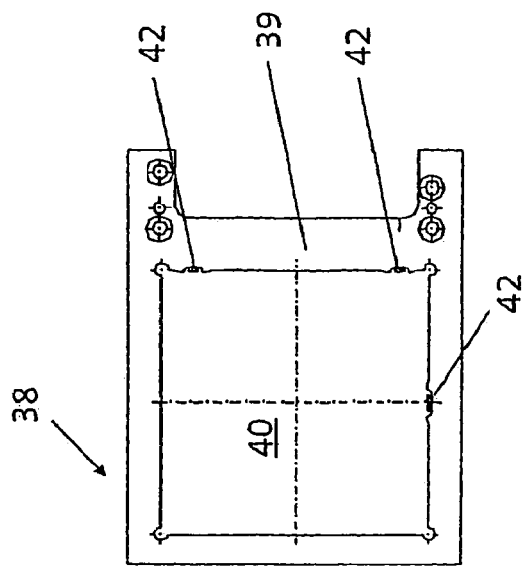
FIG. 7 shows a top view of a holding frame of the active unit shown in FIG. 6.

FIG. 7 shows a top view of the holding frame 38. The holding frame has a support section 39, which rests on the spacer block 37 during assembly and is bolted to the spacer block. Furthermore, a central frame recess 40 is provided, into which a support plate 41 (see FIG. 8) can be inserted. To be able to align the support plate 41 in the frame recess 40 quickly and without the necessity of a fine adjustment, permanent magnets 42 are installed in three positions in the holding frame 38 in the embodiment illustrated here. The permanent magnets 42 interact with magnetizable aligning pins 43 mounted on the support plate 41.

Figure 8:
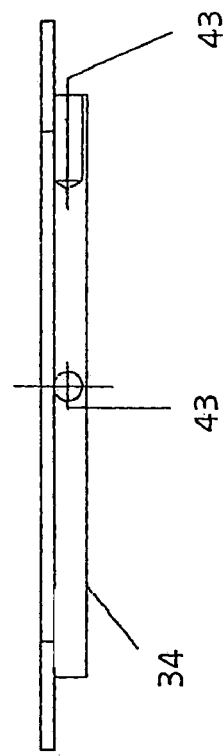
FIG. 8 shows a side view of a support plate of the active unit shown in FIG. 6.

FIG. 8 shows a side view of the support plate 41. The support plate preferably consists of a nonmagnetizable material and, in addition, is adapted to the specific application. The dimensions of the support plate are preferably standardized; for example, a workpiece holder in accordance with DIN 32561-T4 is used as the support plate. This makes it possible to have different manufacturers manufacture workpiece holders or tool supports, since only the dimensions of the support plate must be standardized to be able to use them for a planar direct drive of the invention. This allows a great variety of possible superstructural parts to be mounted on the upper side of the support plate 41.

Obviously, the dimensions of the holding frame 38 are designed in such a way that the holding frame 38 can hold the support plate 41 in an optimum way. As FIG. 8 shows, the aligning pins 43, which produce a frictional connection with the holding frame, are mounted in the support plate. The measurement standard 34, which, together with the measuring sensor, constitutes the position measuring system, is preferably mounted on the underside of the support plate 41. A cross-grating glass scale adhesively bonded to the underside of the support plate is an example of a suitable measurement standard.

It should be noted that several active units can be simultaneously moved on the passive unit. Likewise, several fixed modules can be arranged in the edge regions or in other regions of the passive unit specially intended for this purpose. It will also be immediately apparent to one skilled in the art that in further modifications of the invention, the measurement standard can also constitute the quasi-stationary component, while the measuring sensor is connected as the moving component with the active unit.

Other modifications and refinements of the present invention are possible.

The invention claimed is:

1. A planar direct drive, comprising:
a passive unit, which includes a planar running surface with magnetic flux regions;
an active unit with coil systems for generating a variable magnetic flux;
a bearing unit, which allows near-frictionless two-dimensional relative motion of the active and passive units by maintaining a bearing gap;
a position measuring system that includes a measurement standard and a measuring sensor that scans the measurement standard and supplies a position signal, the positioning system including a moving component and a quasi-stationary component, one of which is formed by the measurement standard, while the other is formed by the measuring sensor, such that both components are arranged outside the bearing gap and a distance from the running surface, the quasi-stationary component being arranged at a predetermined fixed point and substantially parallel to but separated from the running surface, the moving component being mounted on the active unit so that when the moving component reaches the quasi-stationary component the moving component comes into measuring contact with the quasi-stationery component, and the position control of the active unit being controlled or regulated by evaluation of the position signal supplied by the measuring sensor as long as the two components of the position measuring system are in a state of measuring contact.

2. The planar direct drive in accordance with claim 1, wherein the quasi-stationary component is arranged outside of a range of travel required by the coil systems of the active unit and is vertically displaced from the running surface.

3. The planar direct drive in accordance with claim 1, wherein the quasi-stationary component is mounted on frame members and has a permanently fixed position relative to the passive unit.

4. The planar direct drive in accordance with claim 1, wherein the quasi-stationary component is mounted on a second active unit, which can move relative to the passive unit and relative to the first active unit and can be moved to the predetermined fixed points.

5. The planar direct drive in accordance with claim 1, wherein the quasi-stationary component is integrated in a fixed module, whose position in the plane of the passive unit is fixed by at least one mechanical securing device mounted on the passive unit, and at least one holding magnet is integrated in the fixed module so as to hold the fixed module on the running surface of the passive unit.

6. The planar direct drive in accordance with claim 5, wherein the mechanical securing device comprises a stop bar, which is located at an edge of the passive unit and is rigidly mounted on the frame, and several mounting pins that engage the stop bar and the fixed module, the holding magnet comprising at least one electromagnet.

7. The planar direct drive in accordance with any of claim 1, wherein several quasi-stationary components are arranged at several fixed points that are separated from one another.

8. The planar direct drive in accordance with claim 7, wherein the fixed points are formed by several work modules that are mounted on the passive unit.

9. The planar direct drive in accordance with claim 1, comprising several active units that can move on the common passive unit, each of the active units has a moving component and/or a quasi-stationary component.

10. The planar direct drive in accordance with claim 1, wherein the moving component is arranged in an externally accessible area with vertical displacement from the coil systems of the active unit.

11. The planar direct drive in accordance with claim 10, wherein the moving component is mounted with vertical displacement from a workpiece holder mounted on the active unit.

12. The planar direct drive in accordance with claim 11, wherein the moving component and the workpiece holder constitute a structural unit, which is replaceably connected with the active unit.

13. The planar direct drive in accordance with claim 1, wherein the active unit has a holding frame, which is arranged parallel to the active running surface of the active unit, and in which a support plate is replaceably positioned, such that the moving component is arranged in a plane between the coil systems of the active unit and the support plate.

14. The planar direct drive in accordance with claim 13, wherein the moving component is formed by a flat measurement standard, which is mounted on an underside of the support plate.

15. The planar direct drive in accordance with claim 14, wherein the measurement standard is a cross-grating plate, whose parallel misalignment with the active running surface of the active unit is less than 50 $\mu$m.

16. The planar direct drive in accordance with claim 13, wherein the holding frame and the support plate contain alignment devices, which interact by forces of magnetic attraction to position the support plate in a predetermined position in the holding frame.

17. The planar direct drive in accordance with claim 16, wherein the alignment devices consist of several permanent magnets and opposing magnetizable aligning pins, which are inserted in the holding frame or in the support plate, respectively.

18. The planar direct drive in accordance with claim 1, wherein the measuring sensor is an optical or magnetoresistive sensor.

19. The planar direct drive in accordance with claim 1, and further comprising a global measuring system, by which movement of the active unit is controlled as long as the two components of the position measuring system are not in measuring contact.

20. The planar direct drive in accordance with claim 1, wherein the active unit is operative to move in step operation as long as the two components of the position measuring system are not in measuring contact.

21. The planar direct drive in accordance with claim 1, wherein the bearing unit is an air bearing.

* * * * *